US012571944B2

(12) United States Patent     (10) Patent No.:   US 12,571,944 B2
Kotani et al.             (45) Date of Patent:     Mar. 10, 2026

(54) LIGHT-ABSORBING HEAT-SHIELDING FILM, LIGHT-ABSORBING HEAT-SHIELDING MEMBER, ARTICLE, AND METHOD OF PRODUCING THE SAME

(71) Applicant: CANON KABUSHIKI KAISHA, Tokyo (JP)

(72) Inventors: Yoshinori Kotani, Kanagawa (JP); Hiroshi Saito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 724 days.

(21) Appl. No.: 17/482,208

(22) Filed: Sep. 22, 2021

(65) Prior Publication Data

US 2022/0011475 A1     Jan. 13, 2022

Related U.S. Application Data

(63) Continuation of application No. PCT/JP2020/013999, filed on Mar. 27, 2020.

(30) Foreign Application Priority Data

Mar. 29, 2019   (JP) ................................. 2019-068487
Mar. 25, 2020   (JP) ................................. 2020-054971

(51) Int. Cl.
    G02B 5/00       (2006.01)
(52) U.S. Cl.
    CPC ................................... G02B 5/003 (2013.01)
(58) Field of Classification Search
    CPC .... G02B 5/188; G02B 5/1861; G02B 5/1866; G02B 5/1819; G02B 2005/1804; G02B 5/0221; G02B 5/00; G02B 5/003
    See application file for complete search history.

(56) References Cited

U.S. PATENT DOCUMENTS

| 4,396,643 | A | 8/1983 | Kuehn et al. | |
| 2008/0079866 | A1* | 4/2008 | Mimura ................. | F21V 11/06 |
| | | | | 362/311.06 |
| 2014/0077418 | A1 | 3/2014 | Otani et al. | |

(Continued)

FOREIGN PATENT DOCUMENTS

| JP | 85424330 A | 2/1979 |
| JP | 2004261910 A | 9/2004 |

(Continued)

OTHER PUBLICATIONS

Junichi Nakazato, et al., Black Electroless Nickel Plating, Journal of the Surface Finishing Society of Japan, vol. 66, No. 11, pp. 503-506, 2015.

(Continued)

*Primary Examiner* — Sharrief I Broome
*Assistant Examiner* — Journey F Sumlar
(74) *Attorney, Agent, or Firm* — Canon U.S.A., Inc. IP Division

(57) ABSTRACT

The present disclosure provides a light-absorbing heat-shielding film that achieves usually incompatible characteristics of absorbing visible light and near-infrared rays and emitting less far-infrared rays. The present disclosure provides a light-absorbing heat-shielding film including: a metal layer including fine irregularities, wherein an average height of the fine irregularities is 100 nm or more and 1000 nm or less.

21 Claims, 4 Drawing Sheets

(56) References Cited

U.S. PATENT DOCUMENTS

| 2015/0014658 A1* | 1/2015 | Choung | ............... | H10K 50/805 |
| | | | | 257/40 |
| 2021/0139690 A1* | 5/2021 | Oya | ...................... | C08F 265/06 |

FOREIGN PATENT DOCUMENTS

| JP | 2011090225 A | 5/2011 |
| JP | 2013019574 A | 1/2013 |
| JP | 2013076118 A | 4/2013 |
| JP | 2015147969 A | 8/2015 |
| JP | 2017145210 A | 8/2017 |
| WO | 2012/161315 A1 | 11/2012 |
| WO | 2015/146036 A1 | 10/2015 |

OTHER PUBLICATIONS

Takashi Yanagishita, "Recent Trends in Formation and Functionalization of Microstructures by Anodization of Aluminum", Journal of the Surface Finishing Society of Japan, vol. 74, No. 4, Apr. 2023, pp. 170-175.
Nobuyoshi Baba, "Recent Studies on Mechanism of Anodic Oxidation of Aluminum", Journal of the Metal Finishing Society of Japan, vol. 33, No. 5, May 1982, pp. 184-192.

* cited by examiner

LIGHT-ABSORBING HEAT-SHIELDING FILM, LIGHT-ABSORBING HEAT-SHIELDING MEMBER, ARTICLE, AND METHOD OF PRODUCING THE SAME

CROSS-REFERENCE TO RELATED APPLICATIONS

This application is a Continuation of International Patent Application No. PCT/JP2020/013999, filed Mar. 27, 2020, which claims the benefit of Japanese Patent Application No. 2019-068487, filed Mar. 29, 2019 and Japanese Patent Application No. 2020-054971, filed Mar. 25, 2020, all of which are hereby incorporated by reference herein in their entirety.

BACKGROUND OF THE INVENTION

Field of the Invention

The present disclosure relates to a light-absorbing heat-shielding film, a light-absorbing heat-shielding member, and an article, as well as a method of producing the same.

Description of the Related Art

In recent years, the use of heat-shielding materials to suppress temperature rise has been expanding in the interior and exterior parts of optical equipment, space equipment, and transportation products. In addition, materials having both a light-absorbing property and a heat-shielding property are required because heat-shielding materials also having a light-absorbing property can reduce noise caused by stray light when used inside the lens barrels of infrared cameras or in aperture films, and also achieve high dimensional stability owing to the property of not easily rising in temperature. Conventionally, as light-absorbing materials, light-absorbing materials with black electroless nickel plating have been known (for example, "Black Electroless Nickel Plating", Journal of the Surface Finishing Society of Japan, Vol. 66, No. 11, 503-506, 2015). This is a light-absorbing material in which a nickel plating on the surface of an object is oxidized to be formed into a fine irregular shape, thereby blackening the surface. In addition, a technique has been shown to fabricate a resin with a microstructure on its surface by injection molding using a mold with a metal surface having a fine irregular shape (Japanese Patent Application Laid-Open No. 2004-261910).

However, the black-colored material disclosed in the above "Black Electroless Nickel Plating", Journal of the Surface Finishing Society of Japan, Vol. 66, No. 11, 503-506, 2015 emits a large amount of radiation even in the far-infrared region and does not exhibit an excellent heat-shielding property. In addition, the invention described in Japanese Patent Application Laid-Open No. 2004-261910 relates to an injection molding of resin using a mold, and is incapable of molding a metal film in a versatile form. For this reason, it is difficult to apply members thus obtained to various products as light-absorbing heat-shielding members, which poses problem in practical use.

SUMMARY OF THE INVENTION

The present disclosure has been made in view of the above problems, and an object thereof is to provide a light-absorbing heat-shielding member having usually incompatible characteristics of absorbing visible light and near-infrared rays (that is, low reflective index) and emitting less far-infrared rays (that is, high reflective index).

A light-absorbing heat-shielding film according to the present disclosure includes a metal layer including fine irregularities, wherein a height of the fine irregularities is 100 nm or more and 1000 nm or less.

Further features of the present invention will become apparent from the following description of exemplary embodiments with reference to the attached drawings.

DESCRIPTION OF THE EMBODIMENTS

Hereinafter, embodiments of the present disclosure are described in detail.

A light-absorbing heat-shielding film according to the present disclosure includes a metal layer including fine irregularities, wherein a height of the fine irregularities is 100 nm or more and 1000 nm or less.

Highly conductive metals such as aluminum and nickel emit less far-infrared rays and have a heat-shielding property, but do not show a light-absorbing property. On the other hand, fine irregular shapes with sub-wavelength structures smaller than the wavelengths of visible light are known to have anti-reflection effects, and to exhibit excellent wavelength band characteristics and incident angle characteristics when the spatial occupancy of the structure is continuously changed. Therefore, when the metal surface is made into fine irregularities, the reflection on the metal surface is suppressed in a wide wavelength region of visible light, the reflective index in the entire visible light region is lowered, so that the surface looks black and exhibits a light-absorbing property. Therefore, it is considered that a metal member having a fine irregular shape structure on its surface can have both light-absorbing and heat-shielding properties. However, the light-absorbing material disclosed in "Black Electroless Nickel Plating", Journal of the Surface Finishing Society of Japan, Vol. 66, No. 11, 503-506, 2015 has a fine irregular shape on its surface obtained by oxidizing the nickel surface, but it emits a large amount of radiation (low reflective index) even in the far-infrared region and does not exhibit a heat-shielding property. Therefore, the present inventors found that, in addition to the heat-shielding property of the metal itself that forms the light-absorbing heat-shielding film, the specific shape of the fine irregular shape on the metal surface was important for the exhibition of the heat-shielding property. Thus, the present disclosure was completed.

Specifically, including specific fine irregularities provided on the metal layer, the light-absorbing heat-shielding film of the present disclosure can exhibit both light-absorbing property and heat-shielding property. In particular, the light-absorbing heat-shielding film of the present disclosure preferably has a reflective index of 10% or less in the visible light region (550 nm) and a reflective index of 70% or more in the far-infrared light region (10 μm).

<Light-Absorbing Heat-Shielding Film>

Figures 1A, 1B, 1C, 2A, 2B, 3A, 3B:
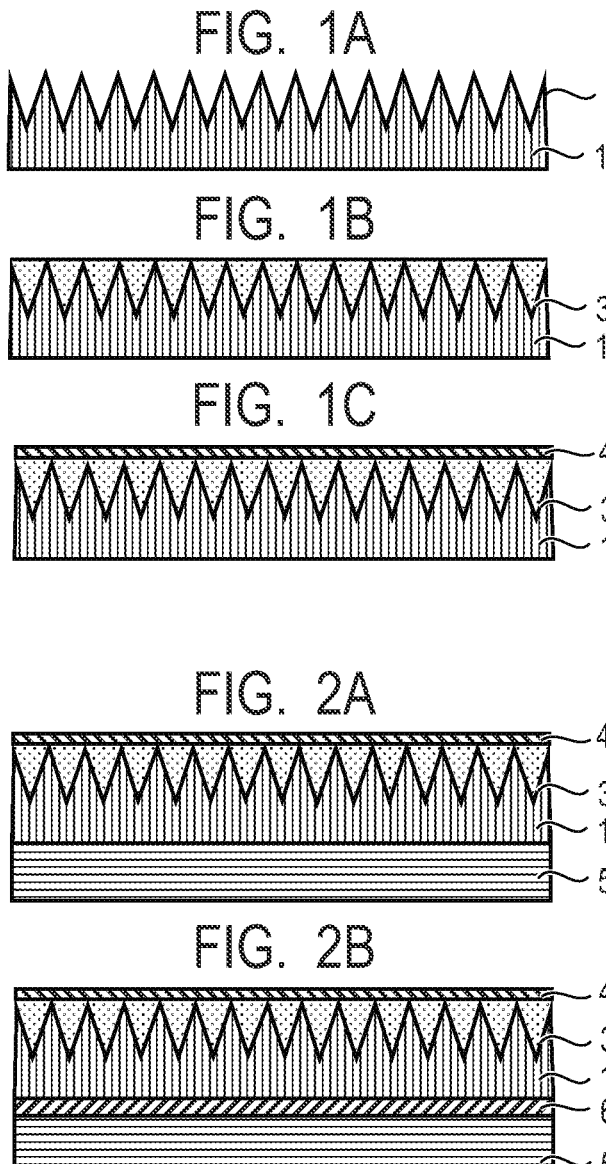
FIG. 1A is a schematic diagram showing an embodiment of the light-absorbing heat-shielding film of the present disclosure.
FIG. 1B is a schematic diagram showing an embodiment of the light-absorbing heat-shielding film of the present disclosure.
FIG. 1C is a schematic diagram showing an embodiment of the light-absorbing heat-shielding film of the present disclosure.
FIG. 2A is a schematic diagram showing an embodiment of the light-absorbing heat-shielding member of the present disclosure.
FIG. 2B is a schematic diagram showing an embodiment of the light-absorbing heat-shielding member of the present disclosure.
FIG. 3A is a process diagram showing an embodiment of the method of producing a light-absorbing heat-shielding member of the present disclosure.
FIG. 3B is a process diagram showing an embodiment of the method of producing a light-absorbing heat-shielding member of the present disclosure.

The light-absorbing heat-shielding film of the present disclosure is described with reference to FIGS. 1A to 1C. As shown in FIG. 1A, an embodiment of the light-absorbing heat-shielding film of the present disclosure is a light-absorbing heat-shielding film which includes a metal layer 1 including fine irregularities 2 on its surface. A highly conductive metal is preferable as the material for the metal layer 1. Examples of highly conductive metals include silver, copper, gold, aluminum, magnesium, tungsten, cobalt, zinc, nickel, and chromium. Nickel, zinc, and chromium are preferable, and nickel is particularly preferable. The fine irregularities 2 provided on the surface of the metal layer 1 are also preferably made of the above highly conductive metal, and more preferably made of the same metal as the metal layer 1. In addition, a transparent metal oxide may be attached to the surface of the fine irregularities 2.

The fine irregularities 2 are fine irregularities provided on one surface of the metal layer 1, and the height of the fine irregularities 2 refers to the difference in height between the apex of the convex portion and the bottom point of the concave portion formed on the surface of the metal layer. The average height of the fine irregularities 2 is 100 nm or more and 1000 nm or less, and preferably 100 nm or more and 500 nm or less. Further, a transparent metal oxide may be attached to the surface of the fine irregularities 2. The average height of the fine irregularities 2 containing the transparent metal oxide is preferably 150 nm or more and 600 nm or less. Here, the height of the fine irregularities 2 or the height of the fine irregularities 2 containing a transparent metal oxide refers to the difference in height between the top of the mountain and the bottom of the valley, as specified in JIS-B-061, "Definition and Indication of Surface Roughness," and is equivalent to the maximum roughness (Rmax). In addition, it is preferable that the light-absorbing heat-shielding film of the present disclosure have, on its surface, an average surface roughness Ra', which is a surface extension of the centerline average roughness Ra, of 1 nm or more and 50 nm or less. Here, the average surface roughness Ra' value (nm) is the centerline average roughness Ra defined in JIS-B-0601, applied to the measurement surface and extended to three dimensions, and is expressed as "a value obtained by averaging the absolute values of deviation from the reference surface to the specified surface" and is obtained by the following formula (1).

$$Ra' = \frac{1}{S_0} \int_{Y_B}^{Y_T} \int_{X_L}^{X_R} |F(X, Y) - Z_0| d_X d_Y \qquad \text{Formula (1)}$$

In the formula (1), Ra' is the average surface roughness (nm), $S_0$ is the area $|X_R - X_L| \times |Y_T - Y_B|$ where the measurement surface is ideally flat, F(X, Y) is the height at the measurement point (X, Y) where the X-coordinate is X and the Y-coordinate is Y, $X_L$ and $X_R$ are the range of the X-coordinate of the measurement surface, $Y_B$ and $Y_T$ are the range of the Y-coordinate of the measurement surface, and $Z_0$ is the average height in the measurement surface.

Further, in the light-absorbing heat-shielding film of the present disclosure, its surface preferably has a specific surface area Sr of 1.0 or more and 3.0 or less. The specific surface area Sr is calculated by the following formula (2).

$$Sr = S/S_0 \qquad \text{Formula (2)}$$

In the formula (2), $S_0$ is the surface area where the measurement surface is ideally flat, and S is the surface area of the actual measurement surface.

Note that the surface area of the actual measured surface is determined by dividing the surface into micro triangles ΔABC composed of three closest data points (A, B, and C), and then determining the area of each micro triangle ΔS using the vector product as described in formula (3) below. The sum of these ΔS is the surface area S to be determined.

$$[\Delta S(\Delta ABC)]^2 = [s(s-AB)(s-BC)(s-CA)] \qquad \text{Formula (3)}$$

In the formula (3), AB, BC, and CA are the lengths of the respective sides, and 2s=AB+BC+CA.

The height of the fine irregularities 2 can be determined by observing the cross section of the light-absorbing heat-shielding film of the present disclosure with a scanning electron microscope or the like. In addition, the average surface roughness Ra' and specific surface area of the surface of the light-absorbing heat-shielding film of the present disclosure can be determined by observing the surface of the metal layer including the fine irregularities by using a scanning probe microscope.

Another embodiment of the light-absorbing heat-shielding film of the present disclosure may include a fine irregular shape 3 of a transparent metal oxide that is in close contact with the fine irregularities 2, as shown in FIG. 1B. In addition, another embodiment of the light-absorbing heat-shielding film of the present disclosure may further include a transparent metal oxide layer 4 that covers the surface of the fine irregular shape 3 of the metal oxide that is not in contact with the fine irregularities 2, as shown in FIG. 1C. Here, close contact means that the metal oxide constituting the fine irregular shape 3 of the metal oxide fills the space surrounded by the fine irregularities 2 and reaches the metal layer 1. Note that when the light-absorbing heat-shielding film includes a fine irregular shape 3 and a metal oxide layer 4, the average surface roughness Ra', which is a surface extension of the centerline average roughness Ra, on the surface of the metal oxide layer 4, which is the surface of the light-absorbing heat-shielding film, is preferably 1 nm or more and 4 nm or less, and the specific surface area Sr of the surface of the light-absorbing heat-shielding film is preferably 1.0 or more and 1.1 or less.

The material of the fine irregular shape 3 of the metal oxide is not particularly limited, but it preferably contains alumina as a main component, and more preferably contains plate-shaped crystals containing alumina as a main component. The plate-shaped crystals containing alumina as a main component are formed of plate-shaped crystals containing an oxide or hydroxide of aluminum or a hydrate thereof as a main component, and a particularly preferable crystal is boehmite. Here, the plate-shaped crystal containing alumina as a main component may be a plate-shaped crystal composed of only alumina, or may be a plate-shaped crystal containing a trace amount of zirconium, silicon, titanium, zinc, or the like in the plate-shaped crystal of alumina.

By providing the fine irregular shape 3 of the metal oxide, it is possible to protect the fine irregularities 2. Further, when the fine irregular shape 3 of the metal oxide has a plate-shaped structure of plate-shaped crystals containing alumina as a main component, it is preferable that the plate-shaped crystals containing alumina as a main component be arranged in the direction perpendicular to the plane direction of the metal layer 1, and that the spatial occupancy of the fine irregular shape 3 continuously change.

The material of the metal oxide layer 4 is not particularly limited, but preferably contains an amorphous gel of alumina. The metal oxide layer 4 increases the hardness of the surface of the light-absorbing heat-shielding film of the present disclosure, while lowering the light-absorbing property thereof. Therefore, the thickness of the metal oxide layer 4 may be appropriately determined so as to satisfy the required hardness and light-absorbing property.

The aluminum elements, silicon elements, and the like in the fine irregularities 2, fine irregular shape 3, and metal oxide layer 4, as well as the metal elements such as silver, copper, gold, aluminum, magnesium, tungsten, cobalt, zinc, nickel, and chromium in the metal layer 1 can be detected by measurement such as energy dispersive X-ray analysis (EDX) or X-ray photoelectron spectroscopy (XPS) during surface or cross-sectional observation with a scanning electron microscope (SEM) or a transmission electron microscope (TEM). When the fine irregularities 2, the fine irregular shape 3, or the metal oxide layer 4 is provided, the ratio of metal oxides such as aluminum elements becomes lower and the ratio of metal elements constituting the metal layer 1 and fine irregularities 2 becomes higher, relatively in the direction perpendicular to the surface direction of the metal layer 1, from the surface (metal oxide layer 4) to the interior (metal layer 1), and finally only the metal elements are detected.

<Light-Absorbing Heat-Shielding Member>

As shown in FIG. 2A, the embodiment of the light-absorbing heat-shielding member of the present disclosure is a light-absorbing heat-shielding member in which a substrate 5 is provided on the surface of the metal layer 1 of the light-absorbing heat-shielding film of the present disclosure on the side opposite to the fine irregularities 2. The shape of the substrate 5 may be any shape as long as it can be formed according to the purpose of use, and examples thereof include, but are not limited to, a flat plate shape, a film shape, and a sheet shape. Examples of the material for the substrate 5 include, but are not limited to, metal, glass, ceramics, wood, paper, and resin. Examples of the resin include films and molded products of thermoplastic resins such as polyester, triacetyl cellulose, cellulose acetate, polyethylene terephthalate, polypropylene, polystyrene, polycarbonate, polymethyl methacrylate, ABS resin, polyphenylene oxide, polyurethane, polyethylene, and polyvinyl chloride; and thermosetting resins such as unsaturated polyester resins, phenolic resins, cross-linked polyurethane, cross-linked acrylic resins, and cross-linked saturated polyester resins.

As shown in FIG. 2B, in another embodiment of the present disclosure, the light-absorbing heat-shielding film and the substrate 5 may be bonded together with an adhesive layer 6. The adhesive layer 6 may be any layer as long as it can bond the light-absorbing heat-shielding film with the substrate 5, and examples thereof include a layer composed of a cured product of adhesive resin (for example, epoxy resin), double-sided tape, and the like.

Note that although FIGS. 2A and 2B show a light-absorbing heat-shielding member provided with the light-absorbing heat-shielding film shown in FIG. 1C, the light-absorbing heat-shielding member may be provided with the light-absorbing heat-shielding film shown in FIG. 1A or 1B instead of the light-absorbing heat-shielding film shown in FIG. 1C.

<Method of Producing Light-Absorbing Heat-Shielding Film and Light-Absorbing Heat-Shielding Member>

Hereinafter, a method of producing the light-absorbing heat-shielding film and the light-absorbing heat-shielding member of the present disclosure is described with reference to FIGS. 3A to 3H.

A method of producing a light-absorbing heat-shielding film of the present disclosure includes a first step of forming a fine irregular shape of a metal oxide; and a second step of forming a metal layer on the fine irregular shape of the metal oxide. The light-absorbing heat-shielding member of the present disclosure further includes a step of bonding a substrate to a surface of the metal layer of the light-absorbing heat-shielding film opposite to a surface in contact with the fine irregular shape of the metal oxide.

(First Step: Step of Producing Fine Irregular Shape of Metal Oxide)

In the first step, a fine irregular shape of a metal oxide to be used as a mold is formed.

The material of the fine irregular shape of the metal oxide is not particularly limited, but preferably contains alumina as a main component. The fine irregular shape can be formed by a known vapor phase method such as chemical vapor deposition (CVD) or physical vapor deposition (PVD), or a sol-gel liquid phase method. With these methods, it is possible to provide a fine irregular shape of a metal oxide containing plate-shaped crystals containing alumina as a main component. Above all, a method of treating a film containing aluminum with warm water to grow alumina plate-shaped crystals is preferable.

Examples of films containing aluminum include alumina gel films formed by applying a sol-gel coating solution containing aluminum compounds, and films containing metallic aluminum formed by dry film formation such as vacuum vapor deposition and sputtering. It is preferable to form a fine irregular shape of a metal oxide by using an alumina gel film from the viewpoints of the reactivity and easiness of adjusting the height of the fine irregular shape of the metal oxide.

As a raw material for the alumina gel film, it is possible to use an aluminum compound such as an aluminum alkoxide, an aluminum halide, or an aluminum salt. From the viewpoint of film forming property, it is preferable to use aluminum alkoxide.

Examples of the aluminum compound include aluminum alkoxides such as aluminum ethoxide, aluminum isopropoxide, aluminum-n-butoxide, aluminum-sec-butoxide, and aluminum-tert-butoxide, oligomers thereof, aluminum halides such as aluminum chloride, aluminum salts such as aluminum nitrate, aluminum acetate, aluminum phosphate, and aluminum sulfate, aluminum acetylacetonate, and aluminum hydroxide.

Further, the alumina gel film may contain an additional compound. Examples of the additional compound include alkoxides of zirconium, silicon, titanium, and zinc, halides, salts, and combinations thereof. When the alumina gel film contains an additional compound, the height of the fine irregular shape of the metal oxide formed can be made greater than in the case where none of these is contained.

As shown below, the alumina gel film is formed on a base substrate by applying a sol-gel coating solution containing an aluminum compound. The sol-gel coating solution is prepared by dissolving the aluminum compound in an organic solvent. The amount of the organic solvent is preferably about 20 times the amount of the aluminum compound in molar ratio.

As the organic solvent, it is possible to use alcohol, carboxylic acid, aliphatic hydrocarbon, alicyclic hydrocarbon, aromatic hydrocarbon, ester, ketone, ether, or a mixed solvent thereof. Examples of the alcohol include methanol, ethanol, 2-propanol, butanol, 2-methoxyethanol, 2-ethoxyethanol, 1-methoxy-2-propanol, 1-ethoxy-2-propanol, 1-propoxy-2-propanol, 4-methyl-2-pentanol, 2-ethylbutanol, 3-methoxy-3-methylbutanol, ethylene glycol, diethylene glycol, and glycerin. Examples of the carboxylic acid include n-butyric acid, α-methylbutyric acid, isovaleric acid, 2-ethylbutyric acid, 2,2-dimethylbutyric acid, 3,3-dimethylbutyric acid, 2,3-dimethylbutyric acid, 3-methylpentanoic acid, 4-methylpentanoic acid, 2-ethylpentanoic acid, 3-ethylpentanoic acid, 2,2-dimethylpentanoic acid, 3,3-dimethylpentanoic acid, 2,3-dimethylpentanoic acid, 2-ethylhexanoic acid, and 3-ethylhexanoic acid. Examples of the aliphatic hydrocarbon or alicyclic hydrocarbon include n-hexane, n-octane, cyclohexane, cyclopentane, and cyclooctane. Examples of the aromatic hydrocarbon include toluene, xylene, and ethylbenzene. Examples of the ester include ethyl formate, ethyl acetate, n-butyl acetate, ethylene glycol monomethyl ether acetate, ethylene glycol monoethyl ether acetate, and ethylene glycol monobutyl ether acetate. Examples of the ketone include acetone, methyl ethyl ketone, methyl isobutyl ketone, and cyclohexanone. Examples of the ether include dimethoxyethane, tetrahydrofuran, dioxane, and diisopropyl ether. Above all, it is preferable to use alcohol from the viewpoint of stability of the sol-gel coating solution.

When aluminum alkoxide is used as an aluminum compound, the aluminum alkoxide being highly reactive to water may cause rapid hydrolysis in contact with moisture in the air or with addition of water, resulting in clouding and precipitation in the sol-gel coating solution. In order to prevent these, it is preferable to add a stabilizer to the sol-gel coating solution to stabilize it. As the stabilizer, it is possible to use β-diketone compounds, β-ketoester compounds, alkanolamines, and the like. Examples of the β-diketone compounds include acetylacetone, trifluoroacetylacetone, hexafluoroacetylacetone, benzoylacetone, 3-methyl-2,4-pentanedione, and 3-ethyl-2,4-pentanedione. Examples of the β-ketoester compounds include methyl acetoacetate, ethyl acetoacetate, butyl acetoacetate, hexyl acetoacetate, allyl acetoacetate, benzyl acetoacetate, acetoacetic acid-isopropyl, acetoacetic acid-2-methoxyethyl, acetoacetic acid-sec-butyl, acetoacetic acid-tert-butyl, and acetoacetic acid-iso-butyl. Examples of the alkanolamines include monoethanolamine, diethanolamine, and triethanolamine. The amount of the stabilizer is preferably about 1 time the amount of the aluminum alkoxide in molar ratio.

A catalyst may be used to accelerate the hydrolysis reaction of the aluminum alkoxide. Examples of the catalyst include nitric acid, hydrochloric acid, sulfuric acid, phosphoric acid, acetic acid, and ammonia.

Further, a water-soluble organic polymer compound can be added to the alumina gel film as needed. The water-soluble organic polymer compound is easily eluted from the alumina gel film by immersion in warm water, which increases the reaction surface area between the aluminum compound and the warm water, enabling the formation of a fine irregular shape at low temperature and in a short time. Further, by changing the type and molecular weight of the organic polymer to be added, it is possible to control the height and the like of the formed fine irregular shape. As the organic polymer, polyether glycols such as polyethylene glycol and polypropylene glycol are preferable because they are easily eluted from the alumina gel film by immersion in warm water. In the alumina gel film, the weight ratio of the amount of polyether glycols to the weight of the weight of the aluminum compound is preferably in the range of 0.1 to 10 times.

A method for producing a fine irregular shape of a metal oxide is described with reference to FIGS. 3A and 3B. A sol-gel coating solution is prepared by dissolving or suspending an aluminum compound and, if necessary, additional compounds, a stabilizer, and a water-soluble organic polymer compound in an organic solvent. This sol-gel coating solution is applied onto the base substrate 8 and dried to form an alumina gel film as a film 7 containing aluminum. Alternatively, a film containing metallic aluminum as the film 7 containing aluminum is formed on the base substrate 8 by dry film formation such as vacuum vapor deposition or sputtering. The material for the base substrate 8 is not particularly limited, and various materials such as glass, plastic, and metal can be used. In the case of forming an alumina gel film using a sol-gel coating solution containing no stabilizer, it is preferable that the atmosphere for application is an inert gas atmosphere such as dry air or dry nitrogen. The relative humidity in the dry atmosphere is preferably 30% or less. As the solution application method for forming the alumina gel film, it is possible to appropriately employ known application means such as a dipping method, a spin coating method, a spray method, a printing method, a flow coating method, and a combination thereof. The film thickness can be controlled by changing the pulling speed in the dipping method, the substrate rotation speed in the spin coating method, and the like, and changing the concentration of the sol-gel coating solution. The drying may be performed at room temperature for about 30 minutes. Further, it is also possible to dry or heat-treat at a higher temperature as needed, and the higher the heat-treatment temperature, the more stable the fine irregular shape 3 of the metal oxide can be formed by the immersion treatment described later. The preferable film thickness of the film 7 containing aluminum is 100 nm or more and 600 nm or less, preferably 100 nm or more and 300 nm or less, and more preferably 100 nm or more and 200 nm or less.

Next, the film 7 containing aluminum is subjected to immersion treatment in warm water to form a fine irregular shape of alumina. By immersing the alumina gel film in warm water, although the surface layer of the alumina gel film is subjected to peptization action and some of the components are eluted, plate-shaped crystals containing alumina as the main component precipitate and grow on the surface layer of the alumina gel film due to the difference in solubility of various hydroxides in warm water, forming a fine irregular shape 3 of the metal oxide. Further, when a film containing metallic aluminum is used instead of the alumina gel film, the aluminum reacts with warm water and is oxidized to alumina, and then the fine irregular shape 3 of the metal oxide is formed as in the case of using the alumina gel film. Therefore, when the material of the base substrate 8 mainly contains aluminum or alumina, it is possible to omit the film formation of the film 7 containing aluminum on the base substrate 8. Note that the temperature of the warm water is preferably 40° C. or more and less than 100° C. The immersion treatment time is preferably about 5 minutes to 24 hours. In the immersion treatment of the alumina gel film to which additional compounds other than the alumina component are added, the plate-shaped crystals of alumina are crystallized by using the difference in solubility of each component in warm water. Therefore, unlike the immersion treatment of the alumina gel film containing a single alumina component, the size of the plate-shaped crystals can be controlled over a wide range by changing the composition of the inorganic components. Further, the height of the fine irregular shape 3 of alumina can be adjusted by adjusting the film thickness of the film 7 containing aluminum. The average height of the fine irregular shape 3 of the metal oxide is preferably 100 nm or more and 1000 nm or less, and more preferably 100 nm or more and 500 nm or less. As a result, it becomes possible to control the fine irregularities formed by the plate-shaped crystals over the above-mentioned wide range.

(Second Step: Step of Forming Metal Layer)

In the second step, a metal layer is formed on the fine irregular shape of the metal oxide, and fine irregularities with the fine irregular shape transferred thereon are formed on the metal layer. The step of forming the metal layer 1 on the fine irregular shape 3 of the metal oxide is described below with reference to FIG. 3C. As a method of forming the metal layer 1, a metal plating treatment is preferable, and an electroless plating treatment is further preferable. In the electroless plating treatment, an aqueous solution containing a palladium compound such as palladium chloride, a gold compound such as gold chloride, a silver compound such as silver chloride, or a tin compound such as tin chloride is applied to the fine irregular shape 3 of the metal oxide, followed by activation. The activation may be performed by immersing the fine irregular shape 3 of the metal oxide together with the base substrate 8 in an aqueous solution having a palladium compound dissolved therein. After that, the metal layer 1 is deposited on the fine irregular shape 3 of the metal oxide using an electroless plating solution. The metal ions in the electroless plating solution correspond to the metal layer of the light-absorbing heat-shielding film of the present disclosure, and an electroless plating solution containing nickel ions, chromium ions, or zinc ions is preferable, and a nickel-plating solution containing nickel ions is particularly preferable. The nickel-plating solution may contain a phosphorus component and a boron component in addition to the nickel component. Examples of commercially available nickel-plating solutions include the Top Nicoron series manufactured by Okuno Chemical Industries Co., Ltd. The temperature of the plating solution in the electroless plating treatment is preferably 30° C. or more and 98° C. or less, and more preferably 50° C. or more and 90° C. or less. The time for performing the electroless plating treatment can be adjusted according to the thickness of the metal layer to be formed, and is usually 30 seconds to 1 hour. In this way, the metal layer 1 is formed so as to fill the gaps of the fine irregular shape, and the metal layer 1 is formed including the fine irregularities 2 with the fine irregular shape 3 of the metal oxide transferred thereon.

It is preferable to perform electroless plating treatment so that the thickness of the metal layer 1 including the fine irregularities 2 is 200 nm or more and 15000 nm or less. Further, the average height of the fine irregularities 2 corresponds to the average height of the fine irregular shape 3 of the metal oxide, and is 100 nm or more and 1000 nm or less. When the thickness of the metal layer 1 including the fine irregularities 2 is 200 nm or more, the light-absorbing heat-shielding film of the present disclosure shows excellent light-absorbing and heat-shielding characteristics.

After performing the electroless plating treatment described above, in order to increase the thickness of the metal layer 1, electroplating treatment may be performed on the surface of the metal layer 1 opposite to the surface provided with the fine irregularities 2. A known electroplating solution can be used for the electroplating treatment. For example, it is possible to use an electroplating solution containing nickel ions, iron ions, copper ions, or the like as the metal ions. When the electroplating treatment is performed using the same metal as the metal of the metal layer 1, the thickness of the metal layer can be increased by the electroplating treatment. Note that when the electroplating treatment is performed using a metal different from the metal of the metal layer 1, the metal layer provided by the electroplating treatment becomes the substrate 5. In addition to inorganic salts that serve as raw materials for metal ions, conductive salts, salts for adjusting counter ions, carboxylic acid-based additives for improving the homogeneity of the plating film, brightening agents, and the like may be added to the electroplating solution as necessary. Further, in the electroplating step, the thickness of the metal layer 1 can be made a desired thickness by adjusting the solution temperature, current density, the plating time of the electroplating solution. If necessary, before the electroplating step, an aqueous solution containing an acid or the like may be used for activation treatment of the surface of the metal layer 1 opposite to the surface provided with the fine irregularities 2. Further, in order to improve the quality of the film formed by the electroplating treatment, in addition to stirring the electroplating solution during the electroplating treatment, a step of removing foreign matters in the electroplating solution may be included.

(Third Step: Step of Bonding Substrate)

Figures 3C, 3D, 3E, 3F, 3G, 3H:
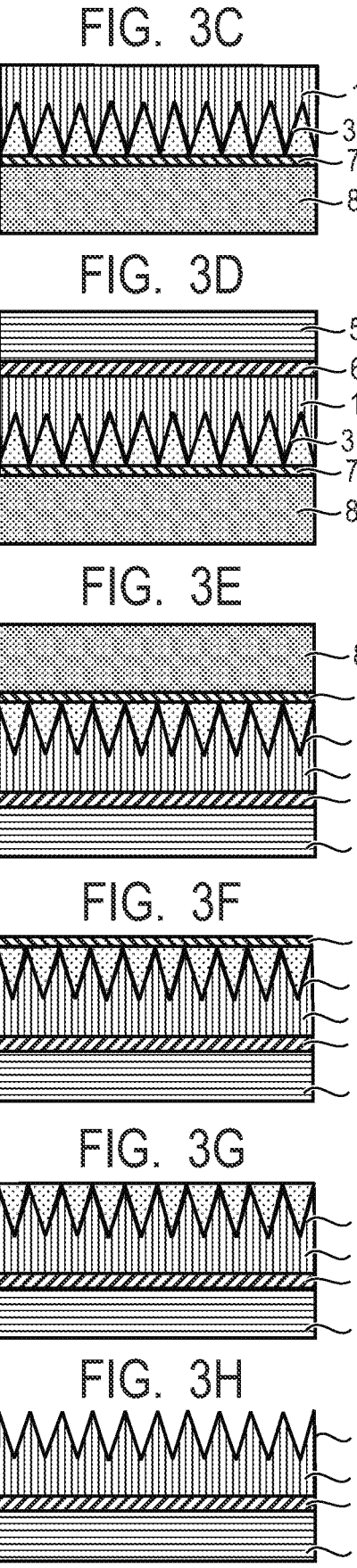
FIG. 3C is a process diagram showing an embodiment of the method of producing a light-absorbing heat-shielding member of the present disclosure.
FIG. 3D is a process diagram showing an embodiment of the method of producing a light-absorbing heat-shielding member of the present disclosure.
FIG. 3E is a process diagram showing an embodiment of the method of producing a light-absorbing heat-shielding member of the present disclosure.
FIG. 3F is a process diagram showing an embodiment of the method of producing a light-absorbing heat-shielding member of the present disclosure.
FIG. 3G is a process diagram showing an embodiment of the method of producing a light-absorbing heat-shielding member of the present disclosure.
FIG. 3H is a process diagram showing an embodiment of the method of producing a light-absorbing heat-shielding member of the present disclosure.

In the production of the light-absorbing heat-shielding member of the present disclosure, as shown in FIG. 3D, the substrate 5 is bonded to the surface of the metal layer 1 obtained above opposite to the surface provided with the fine irregularities 2. As the shape and material of the substrate 5, those described above can be used. When the material of the substrate 5 is a metal, the metal as the substrate 5 may be further laminated on the surface of the metal layer 1 opposite to the surface provided with the fine irregularities 2. As a method of laminating the metal, lamination may be performed by the above electroplating treatment, or lamination may be performed by physical vapor deposition such as sputtering. In addition, when the material of the substrate 5 is a resin, the substrate may be provided by depositing the resin as the substrate 5 on the surface of the metal layer 1 opposite to the fine irregular shape 3 of the metal oxide, followed by curing. The substrate 5 may be bonded to the metal layer 1 with the adhesive layer 6. The adhesive material used for the adhesive layer 6 is not particularly limited, and may be any material as long as the substrate 5 and the metal layer 1 are firmly bonded to each other.

(Fourth Step: Etching Step)

The etching step is described in detail using the example of a light-absorbing heat-shielding member including a substrate 5 and an adhesive layer 6 as shown in FIGS. 3E to 3H, but the same applies to a light-absorbing heat-shielding member including only the substrate 5 without the adhesive layer 6 and a light-absorbing heat-shielding film without the substrate 5 and the adhesive layer 6. Note that FIG. 3E shows the light-absorbing heat-shielding member shown in FIG. 3D inverted upside down.

First, in order to obtain the light-absorbing heat-shielding member of the present disclosure, the base substrate 8 is removed as shown in FIG. 3F. The light-absorbing heat-shielding member after removing the base substrate 8 includes a film 7 containing aluminum on the surface thereof. When the film 7 containing aluminum is a film containing metallic aluminum, visible light is reflected by the metallic aluminum, so that it is necessary to further remove the film containing metallic aluminum by etching, as shown in FIG. 3G. In addition, when the film 7 containing aluminum is an alumina gel film, the alumina gel film is the metal oxide layer 4 of the light-absorbing heat-shielding member. Therefore, the alumina gel film may be removed by etching so as to satisfy the required surface hardness and light-absorbing property. As the etching method, wet etching is preferable in which an acid or alkaline solution is used to dissolve the film 7 containing aluminum. Examples of the acid include hydrochloric acid, nitric acid, and sulfuric acid. Examples of the alkali include sodium hydroxide and potassium hydroxide. From the viewpoint of work efficiency, an etching method using an alkaline solution is more preferable. The etching concentration is preferably in the range of several percent to several tens of percent, and the etching time is preferably in the range of several hours to several days. Further, as shown in FIG. 3H, the fine irregular shape 3 of the metal oxide may also be removed by etching. The light-absorbing heat-shielding member in which the metal layer 1 including the fine irregularities 2 on the outermost surface is bonded to the substrate 5 via the adhesive layer 6 achieves particularly excellent light-absorbing property.

The residual metal oxide such as alumina after etching can be detected, for example, by measuring EDX or XPS when observing the surface or cross section by SEM or TEM.

As described above, the degree of the etching treatment may be adjusted according to the balance between the light-absorbing property and the surface hardness of the desired light-absorbing heat-shielding member or light-absorbing heat-shielding film. Further, prior to performing the substrate adhesion step as the third step, the etching step of this step may be performed, and after that the substrate may be bonded.

The light-absorbing heat-shielding member and the light-absorbing heat-shielding film of the present disclosure thus obtained include the metal layer 1 including fine irregularities 2, so that the reflective index in the visible light region is low because they absorb visible light, and the reflective index in the far-infrared region is high because they emit less far-infrared rays, thus achieving excellent light-absorbing and heat-shielding characteristics.

By providing the light-absorbing heat-shielding film of the present disclosure on the surface of various members or articles, the light-absorbing heat-shielding member can be obtained. The light-absorbing heat-shielding film of the present disclosure is preferably used for a heating element as a member or an article. Examples of the article provided with such a heating element include a battery, an engine, a motor, and a vehicle. In addition, the light-absorbing heat-shielding film of the present disclosure can also be used for clothes and the like. Further, the light-absorbing heat-shielding film of the present disclosure may be used as a heat-shielding decorative film. For example, the light-absorbing heat-shielding film of the present disclosure can be provided as a heat-shielding decorative film on the surface of vehicle interiors, mobile devices, home appliances, parasols, and tent supplies. Various adhesives can be used when the light-absorbing heat-shielding film of the present disclosure is provided on the surface of a member or an article. Therefore, the light-absorbing heat-shielding film of the present disclosure can be provided on the surfaces of members and articles according to the purpose of use, and the surfaces of members and articles are not limited to those that are smooth, and may have a two-dimensional or three-dimensional curved surface.

Conventionally, in an infrared thermal image camera, when various members or articles are present within the angle of view, it is difficult to identify the member or article to be detected. The member or article provided with the light-absorbing heat-shielding film of the present disclosure on the outermost surface causes a difference in detected temperature as compared with the member or article not provided with the light-absorbing heat-shielding film, and therefore, by using the light-absorbing heat-shielding film of the present disclosure, it is possible to clearly identify the member or article. Since an infrared thermal image camera normally has an error range of detected temperature of 2° C., the detected temperature on the surface of the light-absorbing heat-shielding film opposite to the surface in contact with the member or article may be lower by 3° C. or more than the detected temperature on the portion of the member or article not provided with the light-absorbing heat-shielding film. Here, when the member or article is a heating element, it can be identified more clearly.

EXAMPLES

Hereinafter, the present disclosure is described in more detail with reference to Examples.

However, the present disclosure is not limited to the following Examples.

A lens reflective index measuring device (trade name: USPM-RU III, manufactured by Olympus Corporation) was used for the reflective index spectrum measurement in the visible light regions of Examples.

A Fourier transform infrared spectrophotometer (FT/IR-6600, manufactured by JASCO Corporation) was used for the reflective index spectrum measurement in the infrared region of the examples.

Example 1

(Production of Light-Absorbing Heat-Shielding Member)

An alumina sol solution was prepared by dissolving aluminum-sec-butoxide (hereinafter also referred to as "Al (O-sec-Bu)$_3$") and ethyl acetoacetate (hereinafter also referred to as "EtOAcAc") in 2-propanol (hereinafter also referred to as "IPA") and stirring at room temperature for about 3 hours. The molar ratio of each component in the alumina sol solution was Al(O-sec-Bu)$_3$:EtOAcAc:IPA=1:1:20. A 0.01 M dilute aqueous solution of hydrochloric acid was added to the alumina sol solution so that the amount of hydrochloric acid added was twice the molar ratio of Al(O-sec-Bu)$_3$, and the mixture was refluxed for about 6 hours to prepare a sol-gel coating solution. The sol-gel coating solution was applied onto a quartz glass substrate as the base substrate by the spin coating method to form a coating film. After that, the coating film was heat-treated at 100° C. for 1 hour to obtain a transparent alumina gel film. Next, the alumina gel film was immersed in warm water at 80° C. for 30 minutes and then dried at 100° C. for 10 minutes to form an alumina layer having a fine irregular shape.

An aqueous solution of palladium chloride was applied on the alumina layer having a fine irregular shape by the spin coating method, and then dried at 100° C. After that, it was subjected to immersion treatment in a nickel-phosphorus plating solution set at 80° C. (phosphorus content of about 10 wt %) for 1 minute to form fine irregularities and a nickel layer as a metal layer.

An epoxy-based resin as an adhesive layer was applied to the surface of the obtained metal layer opposite to the alumina layer having a fine irregular shape, cured, and a PET film as a substrate was bonded with the adhesive layer. After that, the light-absorbing heat-shielding member was released from the quartz glass substrate together with the substrate to produce the light-absorbing heat-shielding member.

(Observation of Cross-Sectional Shape)

Figure 4:
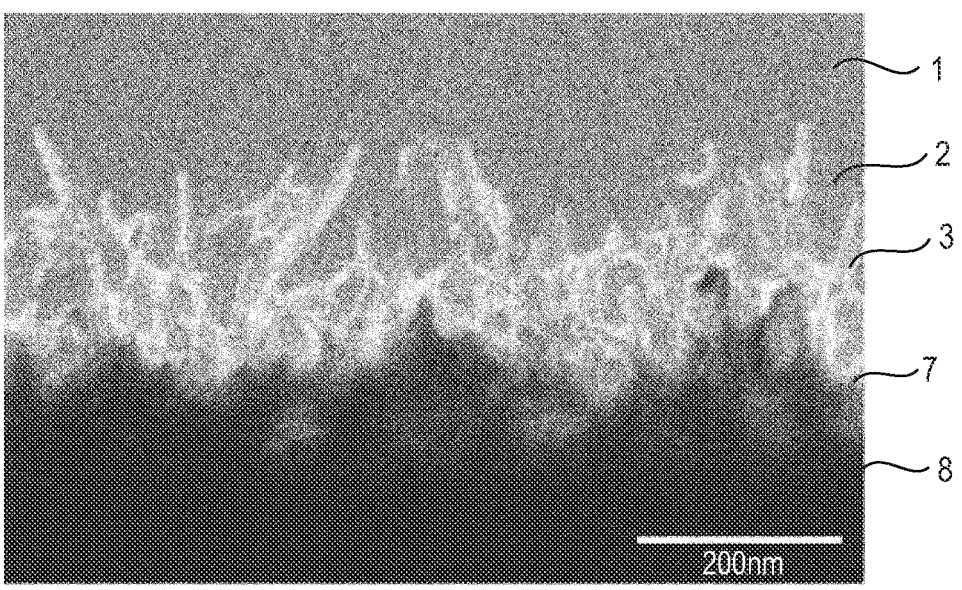
FIG. 4 is an electron microscope observation view of a cross section of the light-absorbing heat-shielding member obtained in Example 1.

In the production of the light-absorbing heat-shielding member described above, a nickel layer was formed on the alumina layer having a fine irregular shape, which was cut out with a dicing saw, and then thinned in the cross-sectional direction by the focused ion beam (FIB) method, and the cross section was observed by SEM. The cross section was observed using a scanning transmission electron microscope (trade name: HD-2300, manufactured by Hitachi High-Technologies Corporation). From the observation image shown in FIG. 4, fine irregularities 2 are formed to fill the inside of the alumina plate-shaped crystals, which have a fine irregular shape 3 of the metal oxide formed from the alumina gel film on the base substrate 8, and a nickel layer as the metal layer 1 is present on top of the fine irregularities 2.

The average height of the fine irregularities 2 of the obtained light-absorbing heat-shielding member was 323 nm, the average height of the fine irregular shape 3 was 255 nm, and the film thickness of the film 7 containing aluminum was 68 nm. On the surface of the light-absorbing heat-shielding member, the average surface roughness Ra' was 1.0 nm, and the specific surface area was 1.0.

(Evaluation of Light-Absorbing Heat-Shielding Member)

Figure 5:
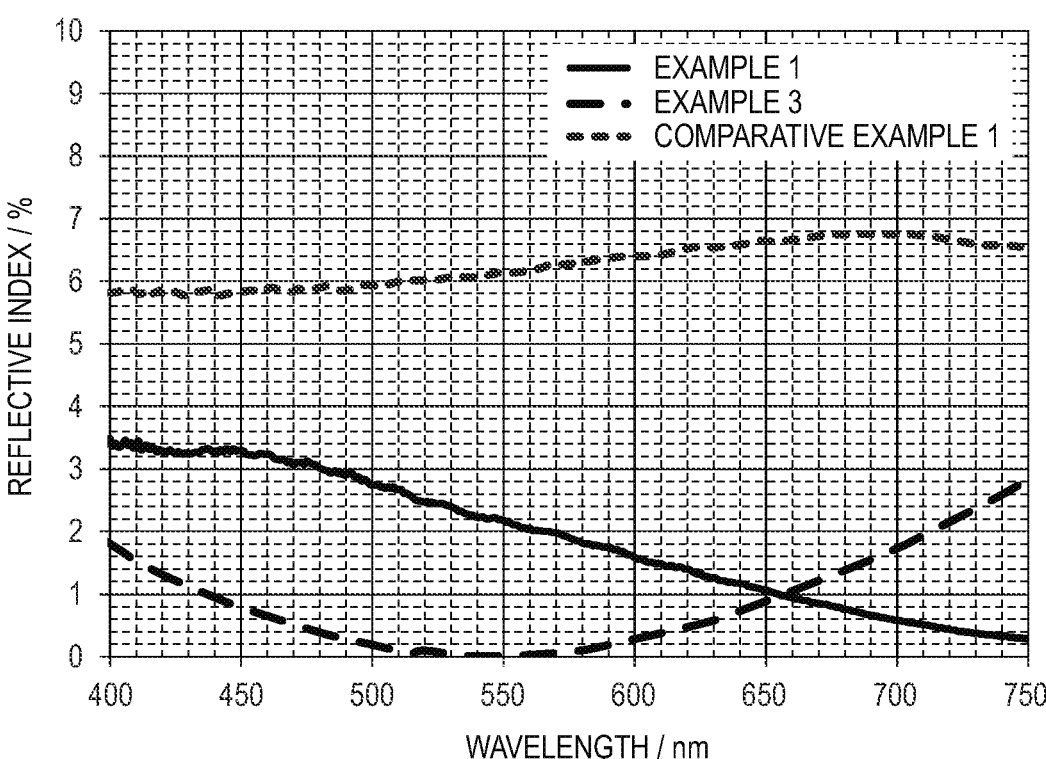
FIG. 5 shows measurement results of the reflective index spectra in the visible light region of the light-absorbing heat-shielding members obtained in Examples 1 and 3 and the light-absorbing member obtained in Comparative Example 1.
Figure 6:
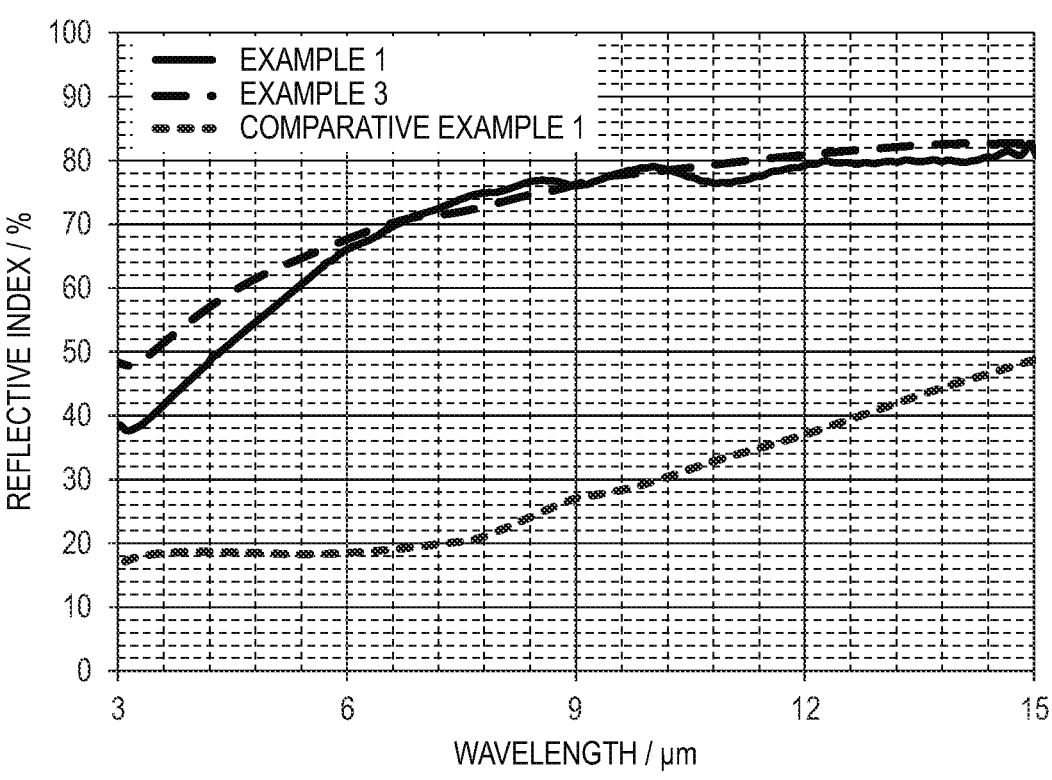
FIG. 6 shows measurement results of the reflective index spectra in the infrared region of the light-absorbing heat-shielding members obtained in Examples 1 and 3 and the light-absorbing member obtained in Comparative Example 1.

For the light-absorbing heat-shielding member obtained in Example 1, the reflective index spectrum in the visible light region and the reflective index spectrum in the infrared region were measured. The reflective index spectrum was measured using a lens reflective index measuring device (trade name: USPM-RU III, manufactured by Olympus Corporation), and the reflective index spectrum in the infrared region was measured using a Fourier transform infrared spectrophotometer (trade name: FT/IR-6600, manufactured by JASCO Corporation). FIG. 5 shows the result of the reflective index spectrum measurement in the visible light region, and FIG. 6 shows the result of the reflective index spectrum measurement in the infrared region. In addition, Table I shows the reflective indices in the visible light and infrared regions obtained by measuring the reflective index spectra in the visible light region and the infrared region of the light-absorbing heat-shielding member. From FIG. 5, it can be said that the light-absorbing heat-shielding member of the present disclosure has an excellent light-absorbing property because the reflective index in the visible light region is low.

From FIG. 6, it can be said that the light-absorbing heat-shielding member of the present disclosure has an excellent heat-shielding property because the reflective index increases toward the long wavelength side in the mid-infrared and far-infrared regions.

Comparative Example 1

As to the light-absorbing material produced by the same method as that described in NPL 1, the reflective index spectrum in the visible light region and the reflective index spectrum in the infrared region were measured under the same conditions as the light-absorbing heat-shielding member of Example 1. FIG. 5, FIG. 6, and Table 1 show the results.

As shown in FIG. 5, although the light-absorbing material of Comparative Example 1 is inferior to the light-absorbing heat-shielding member of Example 1, it can be said that the reflective index in the visible light to near-infrared regions is low and the light-absorbing property is excellent.

On the other hand, as shown in FIG. 6, the light-absorbing material of Comparative Example 1 is inferior in reflective index in the mid-infrared region and the far-infrared region compared to the light-absorbing heat-shielding member of the present disclosure, and cannot be said to have a heat-shielding property.

Example 2

(Production of Light-Absorbing Heat-Shielding Film)

In the same manner as in Example 1, an alumina sol solution was prepared and used for the application onto a quartz glass substrate as the base substrate by the spin coating method to form a coating film. After that, the coating film was heat-treated at 100° C. for 1 hour to obtain a transparent alumina gel film. Next, the alumina gel film was immersed in warm water at 80° C. for 30 minutes and then dried at 100° C. for 10 minutes to form an alumina layer having a fine irregular shape.

An aqueous solution of palladium chloride was applied on the alumina layer having a fine irregular shape by the spin coating method, and then dried at room temperature. After that, it was subjected to immersion treatment in a nickel-phosphorus plating solution set at 80° C. (phosphorus content of about 10 wt %) for 20 minutes to form fine irregularities and a nickel layer as a metal layer.

After that, the light-absorbing heat-shielding film was released from the quartz glass substrate. The total film thickness of the obtained light-absorbing heat-shielding film was about 10 μm. In addition, the average height of the fine irregularities of the light-absorbing heat-shielding film was 303 nm, the average height of the fine irregular shape was 233 nm, and the film thickness of the film containing aluminum was 70 nm. Further, on the light-absorbing heat-shielding film, the average surface roughness Ra' was 1.0 nm, and the specific surface area was 1.0.

Hereinafter, in Examples 3 to 11, light-absorbing heat-shielding films were produced by changing the number of laminated gel films and the etching conditions.

Example 3

Figure 7:
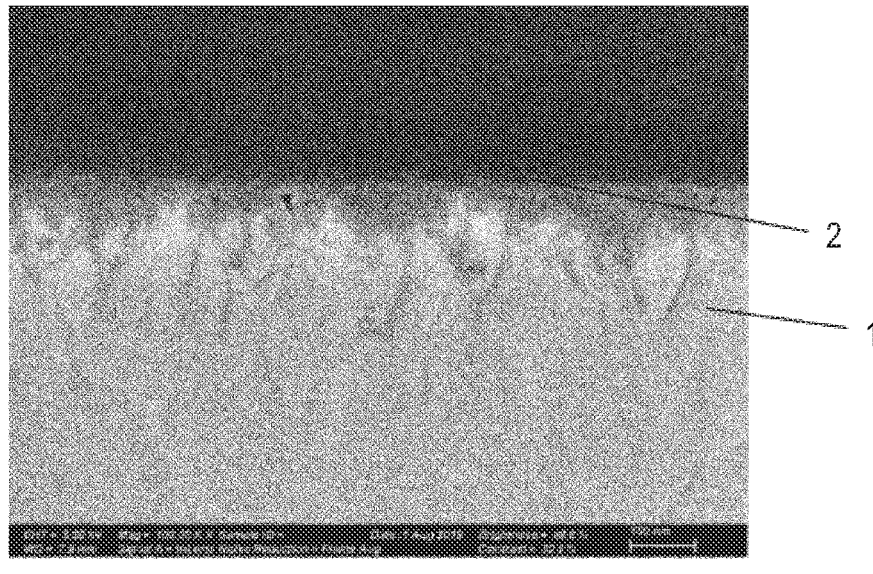
FIG. 7 is an electron microscope observation view of a cross section of the light-absorbing heat-shielding member obtained in Example 3.

A light-absorbing heat-shielding film was produced in the same manner as in Example 2, and as an etching step, the light-absorbing heat-shielding film released from the quartz glass substrate was subjected to etching treatment with a 3 M sodium hydroxide aqueous solution at room temperature for 50 hours to produce a light-absorbing heat-shielding film. A small amount of transparent metal oxide was attached to the fine irregularities after etching. The average height of the fine irregularities containing the transparent metal oxide of the obtained light-absorbing heat-shielding film was 251 nm, and the average height of the fine irregularities was 213 nm, and on the surface of the light-absorbing heat-shielding film, the average surface roughness Ra' was 5.0 nm, and the specific surface area was 1.1. FIG. 5 shows the result of the reflective index spectrum measurement in the visible light region, and FIG. 6 shows the result of the reflective index spectrum measurement in the infrared region. In addition, the cross section was obtained by the FIB method, and the cross section was observed by SEM. The cross section was observed using a scanning electron microscope (trade name: ULTRA 55, manufactured by Carl Zeiss). From the observation image shown in FIG. 7, nickel fine irregularities 2 were formed on the nickel layer as the metal layer 1, and a trace amount of alumina remained on the fine irregularities 2. In the alumina layer detected by SEM-EDX analysis and XPS measurement, the proportion of Al element was relatively low, while the proportion of Ni element was high, from the surface toward the inside in the film thickness direction of the cross section.

Example 4

A light-absorbing heat-shielding film was produced in the same manner as in Example 3 except that the etching treatment was performed in the etching step using a 7.5 M sodium hydroxide aqueous solution at room temperature for 47 hours. The average height of the fine irregularities of the obtained light-absorbing heat-shielding film was 235 nm, and on the surface of the light-absorbing heat-shielding film, the average surface roughness Ra' was 18 nm, and the specific surface area was 1.4.

Example 5

A light-absorbing heat-shielding film was produced in the same manner as in Example 3 except that a nickel-phosphorus plating solution (phosphorus content of about 1 to 2 wt %) was used as the plating solution. The average height of the fine irregularities of the obtained light-absorbing heat-shielding film was 272 nm, and on the surface of the light-absorbing heat-shielding film, the average surface roughness Ra' was 3.8 nm, and the specific surface area was 1.1.

Example 6

The alumina sol solution shown in Example 2 was prepared and applied onto a quartz glass substrate as the base substrate by the spin coating method to form a coating film. After that, the coating film was heat-treated at 100° C. for 1 hour, and further, the film coating and the film drying process were repeated to obtain a transparent alumina gel film as a film containing aluminum with two layers of laminates. Thereafter, a light-absorbing heat-shielding film was produced in the same manner as in Example 2. The average height of the fine irregularities of the obtained light-absorbing heat-shielding film was 306 nm, and the average height of the fine irregular shape was 371 nm, and on the surface of the light-absorbing heat-shielding film, the average surface roughness Ra' was 1.1 nm and the specific surface area was 1.0.

Example 7

A light-absorbing heat-shielding film was produced in the same manner as in Example 6 except that after releasing the metal film provided with an alumina layer from the quartz glass substrate, an etching treatment was performed at room temperature for 50 hours using a 3 M sodium hydroxide aqueous solution as the etching step. The average height of the fine irregularities of the obtained light-absorbing heat-shielding film was 315 nm, and on the surface of the light-absorbing heat-shielding film, the average surface roughness Ra' was 10 nm, and the specific surface area was 1.2.

Example 8

A light-absorbing heat-shielding film was produced in the same manner as in Example 7 except that the etching treatment was performed in the etching step using a 7.5 M sodium hydroxide aqueous solution at room temperature for 50 hours. The average height of the fine irregularities of the obtained light-absorbing heat-shielding film was 303 nm, and on the surface of the light-absorbing heat-shielding film, the average surface roughness Ra' was 27 nm, and the specific surface area was 1.7.

Example 9

A light-absorbing heat-shielding film was produced in the same manner as in Example 2 except that the number of laminated alumina gel films was three. The average height of the fine irregularities of the obtained light-absorbing heat-shielding film was 374 nm, and the average height of the fine irregular shape was 419 nm, and on the surface of the light-absorbing heat-shielding film, the average surface roughness Ra' was 1.2 nm, and the specific surface area was 1.0.

Example 10

A light-absorbing heat-shielding film was produced in the same manner as in Example 9 except that after releasing the metal film provided with an alumina layer from the quartz glass substrate, an etching treatment was performed at room temperature for 50 hours using a 3 M sodium hydroxide aqueous solution in the etching step. The average height of the fine irregularities of the obtained light-absorbing heat-shielding film was 354 nm, and on the surface of the light-absorbing heat-shielding film, the average surface roughness Ra' was 16 nm, and the specific surface area was 1.3.

Example 11

A light-absorbing heat-shielding film was produced in the same manner as in Example 10 except that the etching treatment was performed in the etching step using a 6 M sodium hydroxide aqueous solution at room temperature for 45 hours. The average height of the fine irregularities of the obtained light-absorbing heat-shielding film was 346 nm, and on the surface of the light-absorbing heat-shielding film, the average surface roughness Ra' was 35 nm, and the specific surface area was 2.1.

Table I shows the reflective index in the visible light region and infrared region obtained by measuring the reflective index spectra in the visible light region and infrared region of the light-absorbing heat-shielding films or light-absorbing heat-shielding members produced in Examples 1 to 11 and Comparative Example 1.

TABLE 1

| | Reflective Index (%) | | | | | |
| | Visible Light Region | | | Far-Infrared Region | | |
| | 450 nm | 550 nm | 650 nm | 3 μm | 5 μm | 10 μm |
| Example 1 | 3.2 | 2.2 | 1.0 | 38 | 57 | 79 |
| Example 2 | 5.0 | 2.9 | 1.1 | 46 | 64 | 80 |
| Example 3 | 0.9 | 0.1 | 1.0 | 49 | 63 | 78 |
| Example 4 | 0.5 | 0.1 | 0.4 | 55 | 76 | 87 |
| Example 5 | 4.6 | 2.2 | 1.6 | 62 | 77 | 88 |
| Example 6 | 6.0 | 5.5 | 5.6 | 18 | 50 | 73 |
| Example 7 | 1.0 | 0.6 | 0.5 | 36 | 59 | 80 |
| Example 8 | 0.6 | 0.5 | 0.6 | 42 | 70 | 86 |
| Example 9 | 7.9 | 2.1 | 3.3 | 7 | 44 | 71 |
| Example 10 | 0.7 | 0.9 | 1.1 | 36 | 59 | 80 |
| Example 11 | 0.8 | 1.0 | 1.2 | 40 | 68 | 85 |
| Comparative Example 1 | 5.8 | 6.2 | 6.6 | 17 | 18 | 29 |

Example 12

An article was prepared in which the light-absorbing heat-shielding film produced in Example 3 was attached to the surface of a plate-shaped stainless steel (SUS) (hereinafter referred to as "article including a light-absorbing heat-shielding film"). An article including a light-absorbing heat-shielding film and an article same as the article having a light-absorbing heat-shielding film on the surface except for not having a light-absorbing heat-shielding film (hereinafter referred to as "article not provided with a light-absorbing heat-shielding film") were placed on a heater, and when the surface temperature of the article not provided with a light-absorbing heat-shielding film reached 40° C., an infrared thermography device (model: H2640, manufactured by Nippon Avionics Co., Ltd.) was used to measure the surface temperature of the article including a light-absorbing heat-shielding film and the article not provided with a light-absorbing heat-shielding film. The surface temperature measurement environment was room temperature, and the distance between the article and the measuring device was about 40 cm. The surface temperature of the article including a light-absorbing heat-shielding film was about 28° C., which was lower by about 12° C. than the surface temperature of the article not provided with a light-absorbing heat-shielding film. In addition, when the surface temperature of the article not provided with a light-absorbing heat-shielding film was about 60° C., the surface temperature of the article including a light-absorbing heat-shielding film was about 37° C., which was about 23° C. lower. From the above, it was found that the light-absorbing heat-shielding film of the present disclosure had an excellent heat-shielding property. A clear temperature difference was observed when the detected temperature of the article was compared with the actual temperature, and it was found that the article could be identified with an infrared thermal image camera.

Example 13

An article including a light-absorbing heat-shielding film was prepared by attaching the light-absorbing heat-shielding film produced in Example 5 to the surface of a plate-shaped stainless steel, and in the same manner as in Example 12, the surface temperatures of the article including a light-absorbing heat-shielding film and the article not provided with a light-absorbing heat-shielding film were measured. When the surface temperature of the article not provided with a light-absorbing heat-shielding film was about 40° C., the surface temperature of the article including a light-absorbing heat-shielding film was about 28° C., which was lower by about 12° C. than the surface temperature of the article not provided with a light-absorbing heat-shielding film. In addition, when the surface temperature of the article not provided with a light-absorbing heat-shielding film was about 60° C., the surface temperature of the article including a light-absorbing heat-shielding film was about 33° C., which was about 27° C. lower.

From the above, it was found that the part of the present disclosure is excellent in both light-absorbing property and heat-shielding property.

The present disclosure can provide a light-absorbing heat-shielding film and a light-absorbing heat-shielding member that absorb visible light and near-infrared rays (low reflective index) and emit less far-infrared rays (high reflective index), which are usually incompatible. The light-absorbing heat-shielding film and the light-absorbing heat-shielding member can be used as stray light prevention and heat-shielding members inside optical equipment, as interior and exterior members of space-related equipment such as satellites, as exterior films, and as solar collectors.

According to the present disclosure, use of a light-absorbing heat-shielding film with fine irregularities makes it possible to achieve light-absorbing and heat-shielding characteristics, which are usually incompatible. In addition, when a light-absorbing heat-shielding film of the present disclosure is placed on a surface of a heat-generating member, the detected temperature can be lowered by about 3° C. or more.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A light-absorbing heat-shielding film comprising:

a metal layer including fine irregularities, wherein a surface including the fine irregularities has an average surface roughness Ra' of 1 nm or more and 50 nm or less, wherein an average height of the fine irregularities is 100 nm or more and 1000 nm or less, and wherein the light-absorbing heat-shielding film has a reflective index of 10% or less in the visible light region (550 nm) and a reflective index of 70% or more in the far-infrared light region (10 μm).

2. The light-absorbing heat-shielding film according to claim 1, further comprising: a fine irregular shape of a metal oxide that is in close contact with the fine irregularities.

3. The light-absorbing heat-shielding film according to claim 2, wherein the fine irregular shape of the metal oxide contains plate-shaped crystals containing alumina as a main component.

4. The light-absorbing heat-shielding film according to claim 1, wherein the specific surface area Sr of the surface including the fire irregularities is 1.0 or more and 3.0 or less.

5. The light-absorbing heat-shielding film according to claim 1, wherein a material of the metal layer includes one selected from nickel, chromium, and zinc.

6. A member comprising:

a substrate and the light-absorbing heat-shielding film according to claim 1; wherein the light-absorbing heat-shielding film is provided above the substrate.

7. The member according to claim 6, wherein the light-absorbing heat-shielding film and the substrate are bonded together with an adhesive layer.

8. An article comprising: the light-absorbing heat-shielding film according to claim 1 on an outermost surface thereof.

9. The article according to claim 8, wherein a detected temperature on a surface of the light-absorbing heat-shielding film opposite to a surface in contact with the article is lower by 3° C. or more than a detected temperature on a part of the article not provided with the light-absorbing heat-shielding film.

10. The article according to claim 9, wherein the article is a heating element.

11. Use of the light-absorbing heat-shielding film according to claim 1, wherein by providing the light-absorbing heat-shielding film on an outermost surface of an article, a detected temperature of a surface of the light-absorbing heat-shielding film opposite to a surface in contact with the article is lower by 3° C. or more than a detected temperature on a surface of the article.

12. The use according to claim 11, wherein the article is a heating element.

13. A light-absorbing heat-shielding film comprising:

a metal layer including fine irregularities, wherein the specific surface area Sr of the surface including the fine irregularities is 1.0 or more and 3.0 or less, wherein an average height of the fine irregularities is 100 nm or more and 1000 nm or less, and wherein the light-absorbing heat-shielding film has a reflective index of 10% or less in the visible light region (550 nm) and a reflective index of 70% or more in the far-infrared light region (10 μm).

14. The light-absorbing heat-shielding film according to claim 13, further comprising: a fine irregular shape of a metal oxide that is in close contact with the fine irregularities.

15. The light-absorbing heat-shielding film according to claim 14, wherein the fine irregular shape of the metal oxide contains plate-shaped crystals containing alumina as a main component.

16. The light-absorbing heat-shielding film according to claim 13, wherein a material of the metal layer includes one selected from nickel, chromium, and zinc.

17. A member comprising:

a substrate and the light-absorbing heat-shielding film according to claim 13; wherein the light-absorbing heat-shielding film is provided above the substrate.

18. The member according to claim 17, wherein the light-absorbing heat-shielding film and the substrate are bonded together with an adhesive layer.

19. An article comprising: the light-absorbing heat-shielding film according to claim 17 on an outermost surface thereof.

20. Use of the light-absorbing heat-shielding film according to claim 13, wherein by providing the light-absorbing heat-shielding film on an outermost surface of an article, a detected temperature of a surface of the light-absorbing heat-shielding film opposite to a surface in contact with the article is lower by 3° C. or more than a detected temperature on a surface of the article.

21. The use according to claim 20, wherein the article is a heating element.

* * * * *